W. MORRIS.
VEHICLE WHEEL LUBRICATOR.
APPLICATION FILED MAY 28, 1909.

957,079.

Patented May 3, 1910.

Witnesses
Fenton S. Belt
V. B. Hillyard.

Inventor
William Morris
By Victor J. Evans
Attorney

UNITED STATES PATENT OFFICE.

WILLIAM MORRIS, OF BROOKPORT, ILLINOIS.

VEHICLE-WHEEL LUBRICATOR.

957,079.  Specification of Letters Patent.  Patented May 3, 1910.

Application filed May 28, 1909. Serial No. 498,923.

*To all whom it may concern:*

Be it known that I, WILLIAM MORRIS, a citizen of the United States, residing at Brookport, in the county of Massac and State of Illinois, have invented new and useful Improvements in Vehicle - Wheel Lubricators, of which the following is a specification.

The purpose of the present invention is to devise a novel construction of lubricating means for vehicle wheels to exclude foreign matter from the cup or receptacle containing the supply of oil and also to provide a construction whereby oil may be readily supplied as occasion may require.

The invention consists of the novel features, details of construction and combinations of parts which hereinafter will be more particularly set forth and finally claimed.

Figure 1:
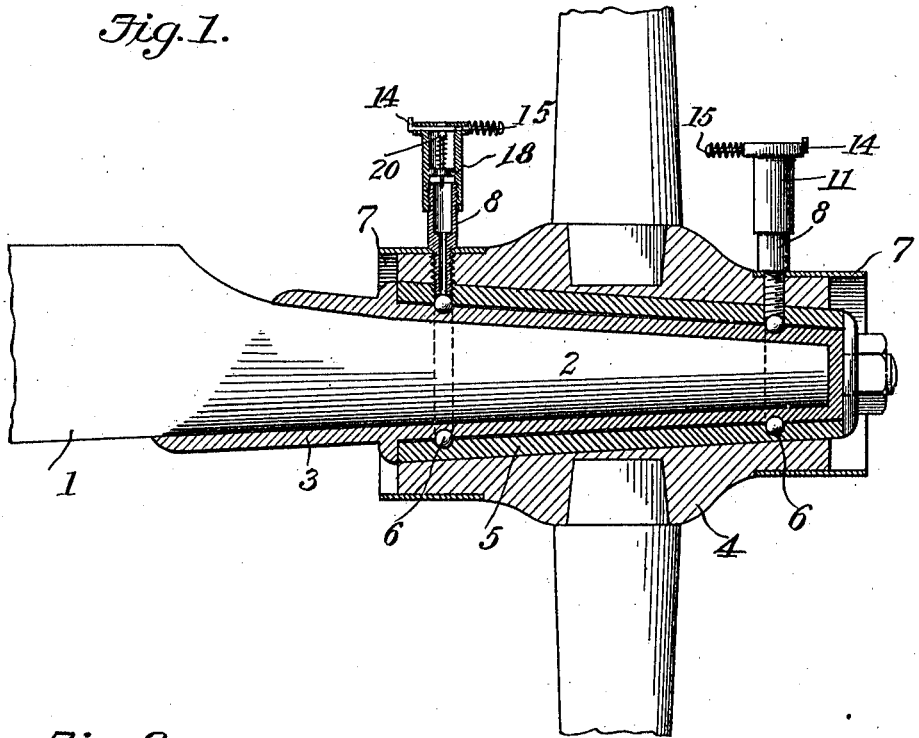
Figure 2:
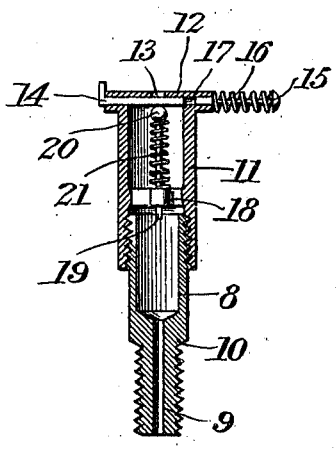

Referring to the drawings forming a part of the specifications: Figure 1 is a longitudinal section of the hub of a vehicle wheel and the axle skein showing the invention applied. Fig. 2 is a sectional view of the preferred form of lubricator.

Corresponding and like parts are referred to in the following description and pointed out in all the views of the drawings by the same reference characters.

The numeral 1 indicates an axle, and 2 the arm thereof. The axle arm is supplied with a skein 3 which tapers and is provided near its inner end with the usual shoulder to limit the inward movement of the hub. The hub 4 is provided with the usual metal box 5 of a size to fit the skein 3. Matching annular grooves are formed in the meeting walls of the axle skein and box 5 to form raceways in which are placed balls 6 constituting antifriction devices between the hub of the wheel and its supporting skein. The balls 6 also form interlocking means between the box 5 and skein 3 thereby preventing longitudinal movement of the hub upon the skein. The ends of the hub 4 are provided with bands 7, Openings are formed in the bands 7, hub 4 and box 5, and communicate at their inner ends with the annular grooves formed in the inner wall of the box. The respective openings in the several parts aline thereby admitting of placing the balls 6 in position or removing said balls from the ball races when it is required to remove the wheel from the axle.

An oil cup or receptacle 8 is provided for each end of the hub 4 and has a threaded stem 9 which is reduced leaving a shoulder 10 at the base thereof. The threaded stem 9 of each oil cup or receptacle is of a length to pass through the registering openings of the band 7, hub 4 and box 5 thereby serving as fastening means to prevent relative displacement of said parts as also to retain the oil cup in place. A cap piece 11 is fitted to the outer end of each oil cup 8 and is connected thereto by means of a screw thread joint. The cap piece 11 has a head 12 at its outer end in which an opening 13 is formed, said head having a horizontal opening or guide-way in which a slide or cut-off 14 is fitted, said slide having a finger piece at one end and a headed stem 15 at the opposite end upon which is mounted a coil spring 16 by means of which said slide or cut-off is held in normal position. An opening 17 is formed in the inner end of the slide or cut-off 14 and is adapted to register with the opening 13 when the slide is drawn outward thereby admitting of lubricant being supplied to the cup or receptacle 8. The finger piece at the outer end of the slide or cut-off 14 also acts as a stop to limit the inward movement of said slide under the pressure exerted by the spring 16. A cross bar 18 is provided intermediate of the cap piece 11 and centrally apertured to receive a stem 19 having a ball or head 20 at its upper end. A spring 21 is mounted upon the stem 19 and is confined between the cross bar 18 and head 20 and normally exerts a pressure to force the head or ball 20 upward so as to close the opening 17 in the cut-off 14 when the latter is drawn outward.

To supply the cup or receptacle 8 with lubricant, the cut-off 14 is drawn outward to bring the opening 17 thereof in register with the opening 13 in the head 12 after which the nozzle of a can is introduced into the opening 13 and moved so as to exert an inward pressure upon the ball or head 20 thereby uncovering the opening 17 and admitting of the lubricant passing from the can into the cup. After the cup or receptacle 8 has been filled or charged, the cut-off 14 is released and is moved inward by the action of the spring 16 thereby closing the opening 13 and preventing dirt or foreign matter from entering said cup.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention, what is claimed is—

In combination, a lubricator comprising a receptacle, a head at the outer end of the receptacle having an opening and a transverse guide-way, a slide arranged to operate in said guide-way, and to normally close the opening in the head of the lubricator and provided with an opening to register with the opening of said head, a spring for holding said slide in its normal position, and a spring-actuated stem located within the lubricator and having a head at its outer end to bear against the inner side of said slide and to close the opening thereof when the slide is drawn outward.

In testimony whereof I affix my signature in presence of two witnesses.

WILLIAM MORRIS.

Witnesses:
S. J. BROWN,
JOHN MORRIS.